United States Patent
Upadhyay

(10) Patent No.: US 12,223,025 B2
(45) Date of Patent: Feb. 11, 2025

(54) SYSTEM AND METHOD FOR FACILITATING MULTI-FACTOR FACE AUTHENTICATION OF USER

(71) Applicant: Gaurav Upadhyay, Hyderabad (IN)

(72) Inventor: Gaurav Upadhyay, Hyderabad (IN)

(73) Assignee: Gaurav Upadhyay

( * ) Notice: Subject to any disclaimer, the term of this patent is extended or adjusted under 35 U.S.C. 154(b) by 351 days.

(21) Appl. No.: 18/054,625

(22) Filed: Nov. 11, 2022

(65) Prior Publication Data

US 2024/0086508 A1     Mar. 14, 2024

(30) Foreign Application Priority Data

Sep. 9, 2022    (IN) .............................. 202241051531

(51) Int. Cl.
*G06F 21/32*     (2013.01)
*G06V 40/16*    (2022.01)

(52) U.S. Cl.
CPC ............ *G06F 21/32* (2013.01); *G06V 40/168* (2022.01)

(58) Field of Classification Search
CPC .... G06F 21/32; G06V 40/168; G06V 40/172; G06V 40/174
See application file for complete search history.

(56) References Cited

U.S. PATENT DOCUMENTS

| | | | |
|---|---|---|---|
| 2018/0096212 A1 | 4/2018 | Lin | |
| 2019/0236259 A1 | 8/2019 | Remillet et al. | |
| 2022/0070236 A1* | 3/2022 | Yerli | ..................... G06V 20/20 |
| 2022/0083636 A1* | 3/2022 | Sarkis | .................. G06V 40/168 |

FOREIGN PATENT DOCUMENTS

KR         102078249 B2     2/2020

OTHER PUBLICATIONS

A Proposed Approach for Biometric-Based Authentication Using of Face and Facial Expression Recognition, 2018 IEEE 3rd International Conference on Communication and Information Systems, Delina Beh Mei Yin, Amalia-Amelia Mukhlas, Rita Zaharah Wan Chik, Abu Talib Othman, Shariman Omar.
Fusion of face recognition and facial expression detection for authentication: a proposed model, Conference: the 11th International Conference on Ubiquitous Information Management and Communication, Delina Beh Mei Yin, Shariman Omar, Bazilah A. Talip and Amalia Mukhlas.

* cited by examiner

*Primary Examiner* — Juan M Guillermety
(74) *Attorney, Agent, or Firm* — Jason C. Cameron

(57) ABSTRACT

A system and method for facilitating multi-factor face authentication of user is disclosed. The method includes receiving a request from a user to authenticate face of the user, extracting a set of facial features from one or more images and one or more videos by using an AI model, and receiving a set of point clouds associated with the face of the user. Further, the method includes receiving one or more inputs from the user to select one or more virtual face filters from a plurality of virtual filters, obtaining one or more prestored authentication parameters and generating a plurality of similarity scores. Furthermore, the method includes determining an authentication status of the user and approving the received request upon determining that the determined authentication status is authentication successful.

20 Claims, 9 Drawing Sheets

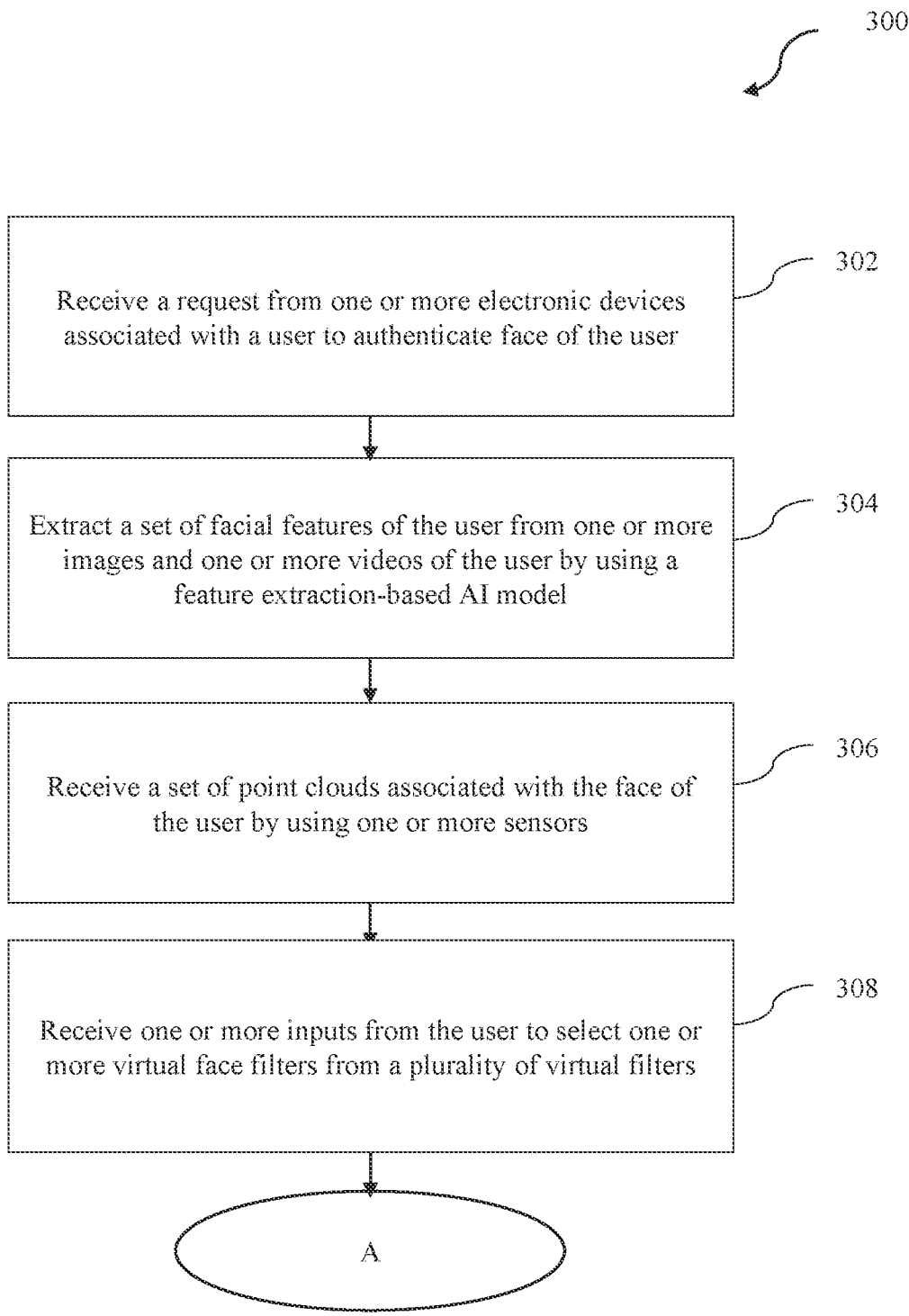
FIG. 3 (contd)

SYSTEM AND METHOD FOR FACILITATING MULTI-FACTOR FACE AUTHENTICATION OF USER

CROSS-REFERENCE TO RELATED APPLICATIONS

This Application claims priority from a patent application filed in India having Patent Application No. 202241051531 filed on Sep. 9, 2022 and titled "SYSTEM AND METHOD FOR FACILITATING MULTI-FACTOR FACE AUTHENTICATION OF USER".

FIELD OF INVENTION

Embodiments of the present disclosure relate to multi-factor authentication systems and more particularly relate to a system and method for facilitating multi-factor face authentication of user.

BACKGROUND

Generally, identity of users is authenticated by using one or more techniques, such as password authentication, biometric authentication, face authentication, token-based authentication, Multi-Factor Authentication (MFA) and the like. The biometric authentication is intrinsic and thus unchangeable. Further, facial recognition technique has become increasingly popular in the past several years. User's face can be used to unlock or access any device or application if the device has a feature of the face authentication. However, it can be easily breached and fails to provide high security as a perpetrator can potentially attempt to access the device using your face, mask, or various other methods. Generally, the MFA provides a stronger level of security by combining something the users know with something they have or are. The use of multiple factors makes it more difficult for perpetrators to steal credentials, use brute force and discretionary attacks to breach authentication systems. Conventionally available MFA systems do not provide high security as the perpetrators may easily breach the security by using one or more deceptive methods, such as entering the password obtained via malware, using a mask, using One Time Password (OTP) obtained via fraud and the like. For example, when the MFA employs the password authentication and voice authentication, the perpetrator may use the password obtained via the malware for the password authentication and a voice bot for voice authentication.

Hence, there is a need for an improved system and method facilitating multi-factor face authentication of user, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system facilitating multi-factor face authentication of user is disclosed. The computing system includes one or more hardware processors and a memory coupled to the one or more hardware processors. The memory includes a plurality of modules in the form of programmable instructions executable by the one or more hardware processors. The plurality of modules include a request receiver module configured to receive a request from one or more electronic devices associated with a user to authenticate face of the user. The received request includes at least one of: one or more images and one or more videos of the user. The plurality of modules include a data extraction module configured to extract a set of facial features of the user from the at least one of: one or more images and one or more videos of the user by using a feature extraction-based Artificial Intelligence (AI) model. Further, the plurality of modules include a data receiver module configured to receive a set of point clouds associated with the face of the user by using one or more sensors. The received set of point clouds represent Three-Dimension (3D) face model of the user. The plurality of modules also include an input receiver module configured to receive one or more inputs from the user to select one or more virtual face filters from a plurality of virtual filters. Furthermore, the plurality of modules include a data obtaining module configured to obtain one or more prestored authentication parameters associated with the user from a storage unit. The one or more authentication parameters include a set of prestored facial features, a set of prestored point clouds and at least one of: a predefined name and a predefined ID for each of the one or more virtual face filters. The plurality of modules include a score generation module configured to generate a plurality of similarity scores for each of the extracted set of facial features, the received set of point clouds and the selected one or more virtual face filters based on the obtained one or more prestored authentication parameters by using corresponding score generation models. The plurality of similarity scores for the selected one or more virtual face filters indicates an exact match. Further, the plurality of modules include a data determination module configured to determine an authentication status of the user by comparing the generated plurality of similarity scores with a predefined threshold score by using the corresponding score generation models. The authentication status is one of: authentication failed and authentication successful. The plurality of modules include a request approval module configured to approve the received request upon determining that the determined authentication status is authentication successful.

In accordance with another embodiment of the present disclosure, a method for facilitating multi-factor face authentication of user is disclosed. The method includes receiving a request from one or more electronic devices associated with a user to authenticate face of the user. The received request includes at least one of: one or more images and one or more videos of the user. The method further includes extracting a set of facial features of the user from the at least one of: one or more images and one or more videos of the user by using a feature extraction-based AI model. Further, the method includes receiving a set of point clouds associated with the face of the user by using one or more sensors. The received set of point clouds represent 3D face model of the user. Also, the method includes receiving one or more inputs from the user to select one or more virtual face filters from a plurality of virtual filters. Further, the method includes obtaining one or more prestored authentication parameters associated with the user from a storage unit. The one or more authentication parameters include a set of prestored facial features, a set of prestored point clouds and at least one of: a predefined name and a predefined ID for each of the one or more virtual face filters. The method includes generating a plurality of similarity scores for each of the extracted set of facial features, the received set of point clouds and the selected one or more virtual face filters based on the obtained one or more prestored authentication parameters by using corresponding score generation models. The plurality of similarity scores for the selected one or more virtual face filters indicates an exact match. Further, the method includes determining an authentication status of the user by comparing the generated plurality of similarity scores with a predefined threshold score by using the corresponding score generation models. The authentication status is one of: authentication failed and authentication successful. The method includes approving the received request upon determining that the determined authentication status is authentication successful.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
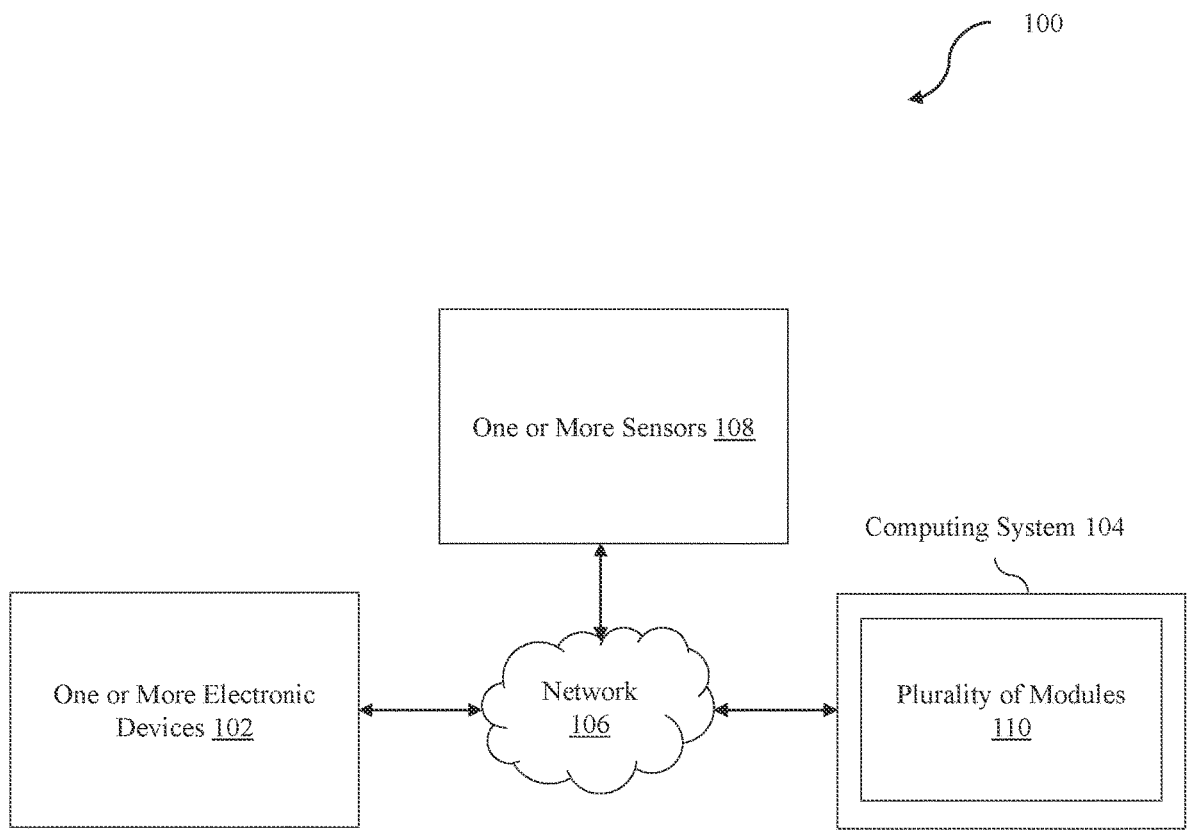
FIG. 1 is a block diagram illustrating an exemplary computing environment for facilitating multi-factor face authentication of user, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 is a block diagram illustrating an exemplary computing environment for facilitating multi-factor face authentication of user, in accordance with an embodiment of the present disclosure. According to FIG. 1, the computing environment 100 includes one or more electronic devices 102 associated with a user communicatively coupled to a computing system 104 via a network 106. The one or more electronic devices 102 are used by the user to request the computing system 104 to authenticate face of the user. Further, the one or more electronic devices 102 are also used by the user to receive one or more inputs from the user to select one or more virtual face filters from a plurality of virtual filters. In an exemplary embodiment of the present disclosure, the one or more electronic devices 102 may include a laptop computer, desktop computer, tablet computer, smartphone, wearable device, smart watch, and the like. In an embodiment of the present disclosure, the computing system 104 may be hosted on a central server, such as cloud server or a remote server. Further, the network 106 may be internet or any other wireless network.

Further, the computing environment 100 includes one or more sensors 108 communicatively coupled to the computing system 104 via the network 106. In an embodiment of the present disclosure, the one or more sensors 108 are used to capture a set of point clouds associated with face of the user. For example, the one or more sensors 108 may include Light Detection and Ranging (LiDAR) sensors, Infrared (IR) sensors and the like. In an embodiment of the present disclosure, the one or more sensors 108 may be in-built in the one or more electronic devices 102.

Furthermore, the one or more electronic devices 102 include a local browser, a mobile application, or a combination thereof. The user may use a web application via the local browser, the mobile application, or a combination thereof to communicate with the computing system 104. In an embodiment of the present disclosure, the computing system 104 includes a plurality of modules 110. Details on the plurality of modules 110 have been elaborated in subsequent paragraphs of the present description with reference to FIG. 2.

In an embodiment of the present disclosure, the computing system 104 is configured to receive the request from the one or more electronic devices 102 associated with the user to authenticate face of the user. In an exemplary embodiment of the present disclosure, the received request includes one or more images, one or more videos of the user or a combination thereof. Further, the computing system 104 extracts a set of facial features of the user from the one or more images, the one or more videos of the user or a combination thereof by using a feature extraction-based Artificial Intelligence (AI) model. The computing system 104 receives the set of point clouds associated with the face of the user by using the one or more sensors 108. The computing system 104 receives one or more inputs from the user to select the one or more virtual face filters from the plurality of virtual filters. Furthermore, the computing system 104 obtains one or more prestored authentication parameters associated with the user from a storage unit. The computing system 104 generates a plurality of similarity scores for each of the extracted set of facial features, the received set of point clouds and the selected one or more virtual face filters based on the obtained one or more prestored authentication parameters by using corresponding score generation models. The plurality of similarity scores for the selected one or more virtual face filters indicates an exact match. The computing system 104 determines an authentication status of the user by comparing the generated plurality of similarity scores with a predefined threshold score by using the corresponding score generation models. In an exemplary embodiment of the present disclosure, the authentication status is authentication failed or authentication successful. The computing system 104 approves the received request upon determining that the determined authentication status is authentication successful.

Figure 2:
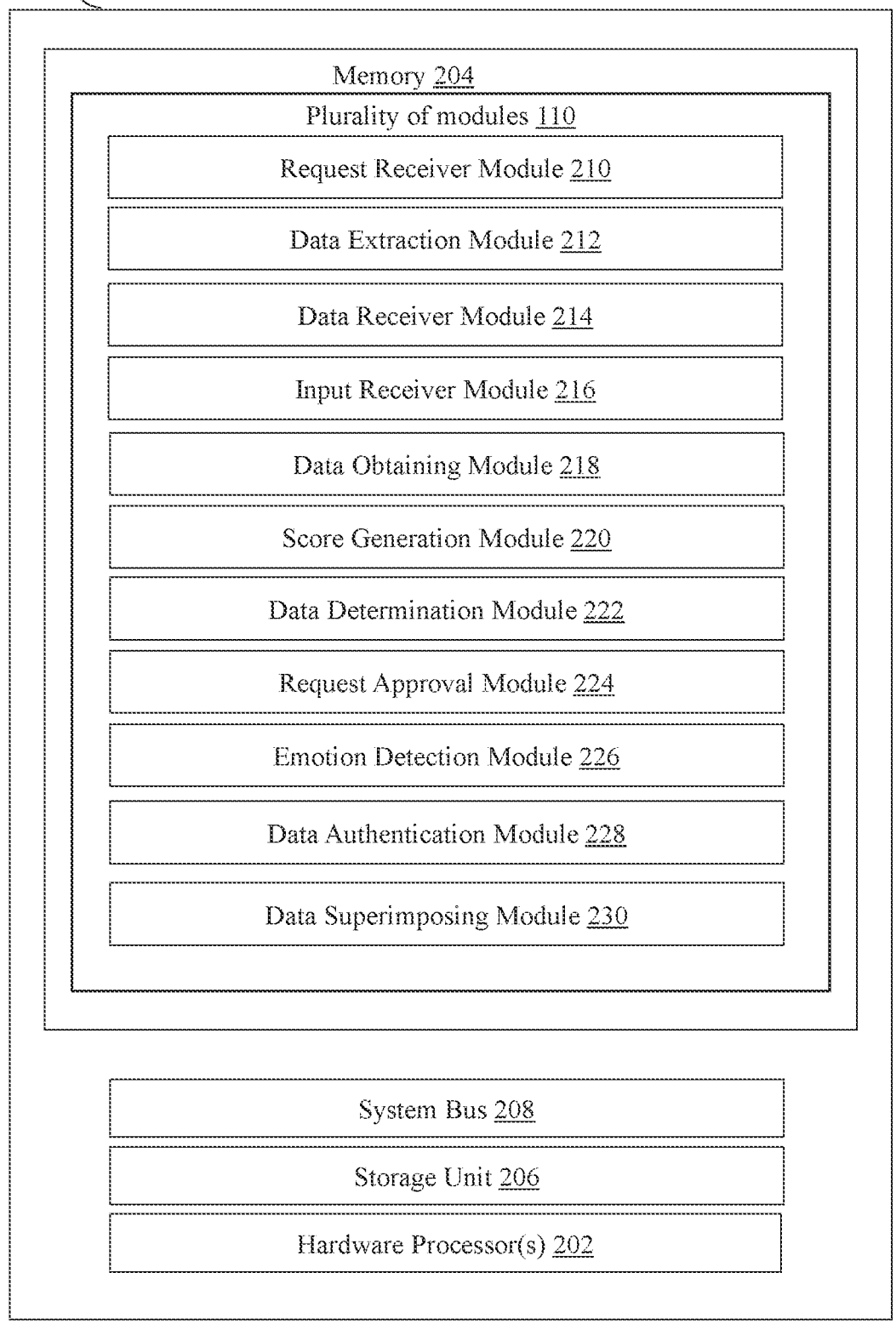
FIG. 2 is a block diagram illustrating the exemplary computing system for facilitating multi-factor face authentication of the user, in accordance with an embodiment of the present disclosure.

FIG. 2 is a block diagram illustrating the exemplary computing system 104 for facilitating multi-factor face authentication of user, in accordance with an embodiment of the present disclosure. Further, the computing system 104 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 110 in the form of programmable instructions executable by the one or more hardware processors 202. Further, the plurality of modules 110 includes a request receiver module 210, a data extraction module 212, a data receiver module 214, an input receiver module 216, a data obtaining module 218, a score generation module 220, a data determination module 222, a request approval module 224, an emotion detection module 226, a data authentication module 228 and a data superimposing module 230.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 110 stored in the form of machine-readable instructions on any of the above-mentioned storage media and may be in communication with and executed by the one or more hardware processors 202.

The storage unit 206 may be a cloud storage. The storage unit 206 may store the received request, the set of facial features, the set of point clouds, the one or more prestored authentication parameters, the plurality of similarity scores, the authentication status, a facial emotion, a predefined facial emotion, a predefined score weightage criteria, the plurality of virtual filters, and the like +facial feature based memory.

The request receiver module 210 is configured to receive the request from the one or more electronic devices 102 associated with the user to authenticate face of the user. In an embodiment of the present disclosure, the face of the user may be authenticated before providing access of sensitive information. For example, the sensitive information may include social security number, contact number, passwords, banking details, education records, medical information, sensitive documents, such as passport, driving license and the like. In an exemplary embodiment of the present disclosure, the received request includes one or more images, one or more videos of the user or a combination thereof. In an exemplary embodiment of the present disclosure, the one or more electronic devices 102 may include a laptop computer, desktop computer, tablet computer, smartphone, wearable device, smart watch, and the like.

The data extraction module 212 is configured to extract the set of facial features of the user from the one or more images, the one or more videos of the user or a combination thereof by using the feature extraction-based AI model. In an exemplary embodiment of the present disclosure, the feature extraction-based AI model is a convolutional neural network. For example, the set of facial features may include eyebrow slant, eye size, nose length, eye spacing, nose width, eye eccentricity, mouth width, mouth openness, pupil size, mouth curvature, eye eccentricity, head eccentricity, and the like.

The data receiver module 214 is configured to receive the set of point clouds associated with the face of the user by using the one or more sensors 108. In an embodiment of the present disclosure, the received set of point clouds represent Three-Dimension (3D) face model of the user. For example, the one or more sensors 108 may LiDAR sensors, IR sensors and the like.

The input receiver module 216 is configured to receive the one or more inputs from the user to select the one or more virtual face filters from the plurality of virtual filters. In an exemplary embodiment of the present disclosure, the plurality of virtual filters include pumpkin head, goaltender, turban, Budai, Nadora's blue eyes, sly, and the like. In an exemplary embodiment of the present disclosure, the one or more virtual face filters include Augmented Reality (AR)-based 3D virtual filter, AR-based 2D virtual filter or a combination thereof. For example, the user may provide the one or more inputs by clicking on screen of the one or more electronic devices 102 to select a tiger virtual filter, such that the tiger virtual filter is superimposed on the face of the user in the one or more images, the one or more videos or a combination thereof. In an embodiment of the present disclosure, each of the plurality of virtual filters include an ID and name associated with it. The ID and the name are stored in the storage unit 206.

The data obtaining module 218 is configured to obtain the one or more prestored authentication parameters associated with the user from the storage unit 206. In an embodiment of the present disclosure, the one or more authentication parameters include a set of prestored facial features, a set of prestored point clouds, and a predefined name, a predefined ID for each of the one or more virtual face filters or a combination thereof. In an embodiment of the present disclosure, the one or more prestored authentication parameters corresponds to the user and are stored during registration process of the user. For example, the set of prestored facial features are facial features of the user extracted and stored in the storage unit 206 during the registration process of the user. Further, the set of prestored point clouds are point clouds corresponding to the face of the user obtained and stored in the storage unit 206 during the registration process of the user. The predefined name and the predefined ID are ID and name of each of the one or more face filters respectively that the user selected during the registration process.

The score generation module 220 is configured to generate the plurality of similarity scores for each of the extracted set of facial features, the received set of point clouds and the selected one or more virtual face filters based on the obtained one or more prestored authentication parameters by using the corresponding score generation models. The plurality of similarity scores for the selected one or more virtual face filters indicates an exact match. In generating the plurality of similarity scores for each of the extracted set of facial features, the received set of point clouds and the selected one or more virtual face filters based on the obtained one or more prestored authentication parameters by using the corresponding score generation models, the score generation module 220 compares the extracted set of facial features with the set of prestored facial features of the user by considering one or more facial parameters by using the corresponding score generation models. Further, the score generation module 220 generates the plurality of similarity scores for the extracted set of facial features based on result of comparison. In an exemplary embodiment of the present disclosure, the one or more facial parameters include with beard, without beard, one or more real objects, age of the user, lighting conditions, haircut, and the like. For example, the one or more real objects may include spectacles, wig, and the like. For example, when the user registers with the computing system 104 without having a beard and later authenticates his face with a beard, the computing system 104 ignores the beard while extracting the set of facial features. Similarly, when the user increases his hair after registering with the computing system 104, the computing system 104 ignores the hair during authentication process while extracting the set of facial features. In yet another example, when the user does not wear the spectacles while registering with the computing system 104 and later wears the spectacles during the authentication process, the computing system 104 ignores the spectacle during the authentication process while extracting the set of facial features. Thus, the accuracy of the computing system 104 in authenticating face of the user is enhanced. In another embodiment of the present disclosure, the one or more real objects are considered while extracting the set of facial features during the authentication process. For example, when the user wears the spectacles during the registration process and the user fails to wear the same spectacles during the authentication process, the computing system 104 rejects the request of authenticating the face of the user. The score generation module 220 compares the received set of point clouds with the set of prestored point clouds by using the corresponding score generation models. The score generation module 220 also generates the plurality of similarity scores for the received set of point clouds based on result of comparison. Furthermore, the score generation module 220 compares name, ID of each of the one or more virtual face filters or a combination thereof with the predefined name, the predefined ID, or a combination thereof by using the corresponding score generation models. The score generation module 220 determines if the name, ID of each of the one or more virtual face filters or a combination thereof exactly matches with the predefined name, the predefined ID, or a combination thereof based on result of comparison. In an embodiment of the present disclosure, if the name, ID of each of the one or more virtual face filters or a combination thereof exactly matches with the predefined name, the predefined ID, or a combination thereof, the received request is approved.

In an embodiment of the present disclosure, one or more sounds are associated with each of the one or more virtual face filters. When the one or more virtual face filters are selected by the user, the one or more sounds are played. For example, the user may remember the one or more virtual face filters and the one or more sounds associated with each of the one or more virtual face filters for the purpose of the authentication. In an embodiment of the present disclosure, the one or more virtual face filters and the one or more sounds have the same name and ID for the purpose of fetching them from the storage unit 206. For example, when the user selects a monkey virtual face filter, the monkey virtual face filter is superimposed on face of the user and monkey screeching sound effects are played, such that the user may easily remember the monkey virtual face filter at the time of authentication.

The data determination module 222 is configured to determine the authentication status of the user by comparing the generated plurality of similarity scores with the predefined threshold score by using the corresponding score generation models. In an embodiment of the present disclosure, the authentication status is authentication failed or authentication successful. For example, when the generated plurality of similarity scores is above the predefined threshold score, the authentication status is authentication successful. when the generated plurality of similarity scores is below the predefined threshold score, the authentication status is authentication failed.

The request approval module 224 is configured to approve the received request upon determining that the determined authentication status is authentication successful. In an embodiment of the present disclosure, the request approval module 224 declines the received request upon determining that the determined authentication status is authentication failed.

The emotion detection module 226 is configured to determine a facial emotion of the user based on the extracted set of facial features by using an emotion determination-based AI model. In an exemplary embodiment of the present disclosure, the facial emotion include smile, anger, contempt, disgust, fear, joy, sadness, surprise, or the like. Further, the emotion detection module 226 obtains a predefined facial emotion associated with the user from the storage unit 206. The predefined facial emotion is a facial emotion of the user obtained and stored in the storage unit 206 during the registration process. The emotion detection module 226 generates the plurality of similarity scores for the determined facial emotion based on the obtained predefined facial emotion by using the corresponding score generation models. In an embodiment of the present disclosure, the plurality of similarity scores for the determined facial emotion is generated by comparing the determined facial emotion with the obtained predefined facial emotion by using the corresponding score generation models. Furthermore, the emotion detection module 226 determines the authentication status of the user by comparing the generated plurality of similarity scores with the predefined threshold score by using the corresponding score generation models. In an embodiment of the present disclosure, the emotion detection module 226 approves the received request upon determining that the determined authentication status is authentication successful.

In determining the authentication status of the user by comparing the generated plurality of similarity scores with the predefined threshold score by using the corresponding score generation models, the data determination module 222 generates an overall score based on the generated plurality of similarity scores for the extracted set of facial features, the generated plurality of similarity scores for the received set of point clouds, the generated plurality of similarity scores for the selected one or more virtual face filters, the generated plurality of similarity scores for the determined facial emotion and a predefined score weightage criteria by using the corresponding score generation models. In an embodiment of the present disclosure, a weightage is assigned to each of the generated plurality of similarity scores for the extracted set of facial features, the generated plurality of similarity scores for the received set of point clouds, the generated plurality of similarity scores for the selected one or more virtual face filters and the generated plurality of similarity scores for the determined facial emotion based on the predefined score weightage criteria. For example, the weightage assigned to the generated plurality of similarity scores for the selected one or more virtual face filters is maximum and the weightage assigned to the generated plurality of similarity scores for the extracted set of facial features is minimum. Further, the data determination module 222 compares the generated overall score with the predefined threshold score by using the corresponding score generation models. Furthermore, the data determination module 222 determines the authentication status of the user based on result of comparison.

In an embodiment of the present disclosure, the data authentication module 228 is configured to generate the plurality of similarity scores for the extracted set of facial features, the received set of point clouds, the selected one or more virtual face filters, the determined facial emotion or any combination thereof based on the obtained one or more prestored authentication parameters and the obtained predefined facial emotion by using the corresponding score generation models. Further, the data authentication module 228 determines the authentication status of the user by comparing the generated plurality of similarity scores associated with the extracted set of facial features, the received set of point clouds, the selected one or more virtual face filters, the determined facial emotion, or any combination thereof with the predefined threshold score by using the corresponding score generation models. Furthermore, the data authentication module 228 approves the received request upon determining that the determined authentication status is authentication successful. For example, the face of the user may be authenticated based on the extracted set of facial features, the set of point clouds, the facial emotion of the user, the selected one or more virtual face filters or any combination thereof.

The data superimposing module 230 superimposes the one or more virtual face filters on the face of the user in the one or more images, the one or more videos or a combination thereof. Further, the data superimposing module 230 extracts the set of facial features of the user from the one or more images, the one or more videos of the user or a combination thereof by using the feature extraction-based AI model. The data superimposing module 230 determines the facial emotion of the user with the superimposed one or more virtual filters based on the extracted set of facial features by using the emotion determination-based AI model. The data superimposing module 230 generates the plurality of similarity scores for the determined facial emotion based on the obtained predefined facial emotion and, the predefined name, the predefined ID or a combination thereof for each of the one or more virtual face filters by using the corresponding score generation models. Furthermore, the data superimposing module 230 determines the authentication status of the user by comparing the generated plurality of similarity scores with the predefined threshold score by using the corresponding score generation models. The data superimposing module 230 approves the received request upon determining that the determined authentication status is authentication successful. For example, the user is required to put a virtual monkey filter on his face and then required to smile in the virtual monkey filter during the authentication process, because the user used the 'virtual monkey filter' as the virtual filter and 'smile' as the facial emotion while registering with the computing system 104.

Figure 3:
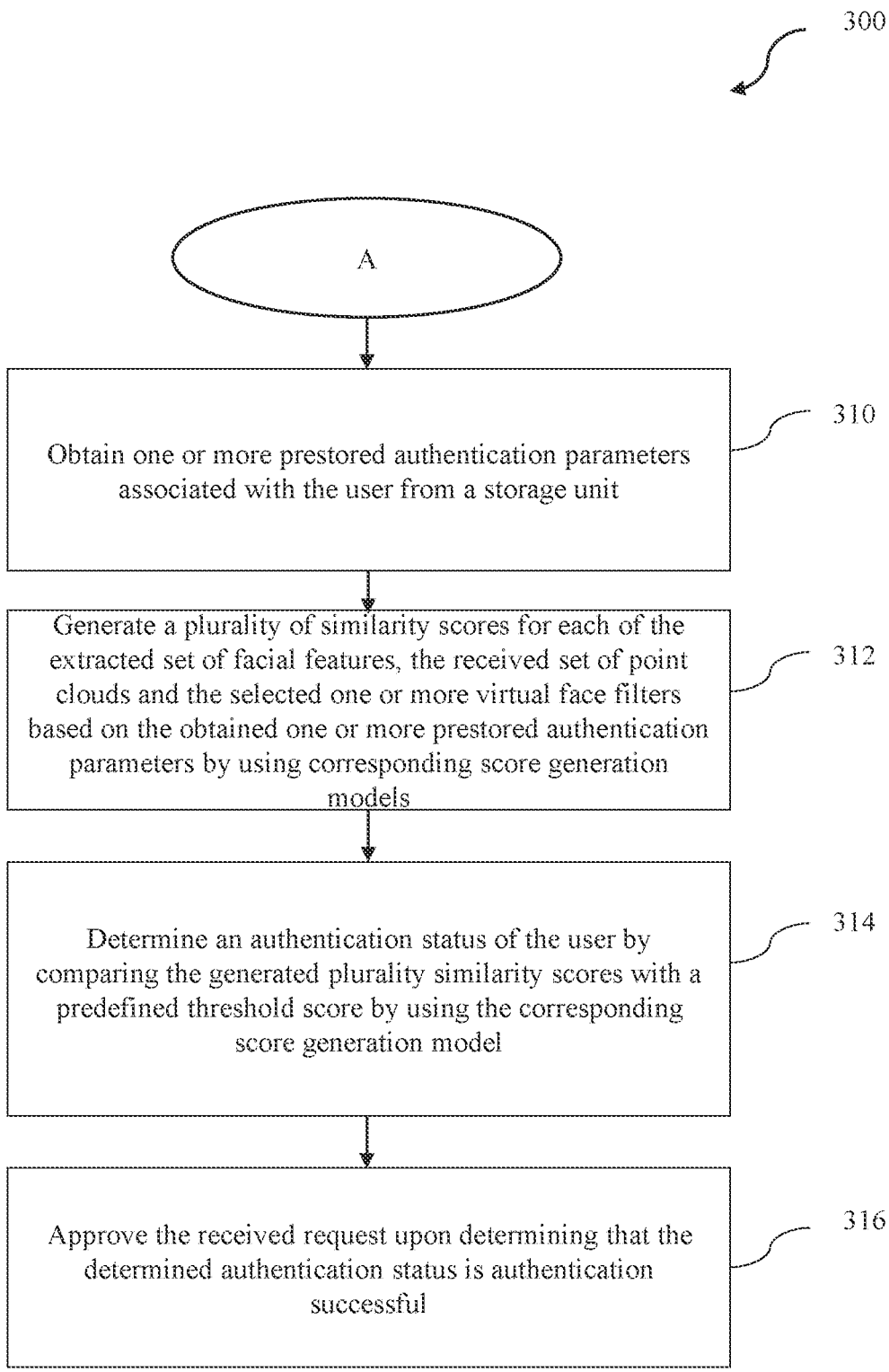
FIG. 3 is a process flow diagram illustrating an exemplary method for facilitating multi-factor face authentication of the user, in accordance with an embodiment of the present disclosure.

FIG. 3 is a process flow diagram illustrating an exemplary method for facilitating multi-factor face authentication of the user, in accordance with an embodiment of the present disclosure. At step 302, a request is received from one or more electronic devices 102 associated with a user to authenticate face of the user. In an embodiment of the present disclosure, the face of the user may be authenticated before providing access of sensitive information. For example, the sensitive information may include social security number, contact number, passwords, banking details, education records, medical information, sensitive documents, such as passport, driving license and the like. In an exemplary embodiment of the present disclosure, the received request includes one or more images, one or more videos of the user or a combination thereof. In an exemplary embodiment of the present disclosure, the one or more electronic devices 102 may include a laptop computer, desktop computer, tablet computer, smartphone, wearable device, smart watch, and the like.

At step 304, a set of facial features of the user are extracted from the one or more images, the one or more videos of the user or a combination thereof by using a feature extraction-based AI model. In an exemplary embodiment of the present disclosure, the feature extraction-based AI model is a convolutional neural network. For example, the set of facial features may include eyebrow slant, eye size, nose length, eye spacing, nose width, eye eccentricity, mouth width, mouth openness, pupil size, mouth curvature, eye eccentricity, head eccentricity, and the like.

At step 306, a set of point clouds associated with the face of the user are received by using the one or more sensors 108. In an embodiment of the present disclosure, the received set of point clouds represent Three-Dimension (3D) face model of the user. For example, the one or more sensors 108 may LiDAR sensors, IR sensors and the like.

At step 308, one or more inputs are received from the user to select one or more virtual face filters from a plurality of virtual filters. In an exemplary embodiment of the present disclosure, the plurality of virtual filters include pumpkin head, goaltender, turban, Budai, Nadora's blue eyes, sly, and the like. In an exemplary embodiment of the present disclosure, the one or more virtual face filters include Augmented Reality (AR)-based 3D virtual filter, AR-based 2D virtual filter or a combination thereof. For example, the user may provide the one or more inputs by clicking on screen of the one or more electronic devices 102 to select a tiger virtual filter, such that the tiger virtual filter is superimposed on the face of the user in the one or more images, the one or more videos or a combination thereof. In an embodiment of the present disclosure, each of the plurality of virtual filters include an ID and name associated with it. The ID and the name are stored in the storage unit 206.

At step 310, one or more prestored authentication parameters associated with the user are obtained from a storage unit 206. In an embodiment of the present disclosure, the one or more authentication parameters include a set of prestored facial features, a set of prestored point clouds, and a predefined name, a predefined ID for each of the one or more virtual face filters or a combination thereof. In an embodiment of the present disclosure, the one or more prestored authentication parameters corresponds to the user and are stored during registration process of the user. For example, the set of prestored facial features are facial features of the user extracted and stored in the storage unit 206 during the registration process of the user. Further, the set of prestored point clouds are point clouds corresponding to the face of the user obtained and stored in the storage unit 206 during the registration process of the user. The predefined name and the predefined ID are ID and name of each of the one or more face filters respectively that the user selected during the registration process.

At step 312, a plurality of similarity scores is generated for each of the extracted set of facial features, the received set of point clouds and the selected one or more virtual face filters based on the obtained one or more prestored authentication parameters by using corresponding score generation models. The plurality of similarity scores for the selected one or more virtual face filters indicates an exact match. In generating the plurality of similarity scores for each of the extracted set of facial features, the received set of point clouds and the selected one or more virtual face filters based on the obtained one or more prestored authentication parameters by using the corresponding score generation models, the method 300 includes comparing the extracted set of facial features with the set of prestored facial features of the user by considering one or more facial parameters by using the corresponding score generation models. Further, the method 300 includes generating the plurality of similarity scores for the extracted set of facial features based on result of comparison. In an exemplary embodiment of the present disclosure, the one or more facial parameters include with beard, without beard, one or more real objects, age of the user, lighting conditions, haircut, and the like. For example, the one or more real objects may include spectacles, wig, and the like. For example, when the user registers with a computing system 104 without having a beard and later authenticates his face with a beard, the computing system 104 ignores the beard while extracting the set of facial features. Similarly, when the user increases his hair after registering with the computing system 104, the computing system 104 ignores the hair during authentication process while extracting the set of facial features. In yet another example, when the user does not wear the spectacles while registering with the computing system 104 and later wears the spectacles during the authentication process, the computing system 104 ignores the spectacle during the authentication process while extracting the set of facial features. Thus, the accuracy of the computing system 104 in authenticating face of the user is enhanced. In another embodiment of the present disclosure, the one or more real objects are considered while extracting the set of facial features during the authentication process. For example, when the user wears the spectacles during the registration process and the user fails to wear the same spectacles during the authentication process, the computing system 104 rejects the request of authenticating the face of the user. The method 300 includes comparing the received set of point clouds with the set of prestored point clouds by using the corresponding score generation models. The method 300 includes generating the plurality of similarity scores for the received set of point clouds based on result of comparison. Furthermore, the method 300 includes comparing name, ID of each of the one or more virtual face filters or a combination thereof with the predefined name, the predefined ID, or a combination thereof by using the corresponding score generation models. The method 300 determining if the name, ID of each of the one or more virtual face filters or a combination thereof exactly matches with the predefined name, the predefined ID, or a combination thereof based on result of comparison. In an embodiment of the present disclosure, if the name, ID of each of the one or more virtual face filters or a combination thereof exactly matches with the predefined name, the predefined ID, or a combination thereof, the received request is approved.

In an embodiment of the present disclosure, one or more sounds are associated with each of the one or more virtual face filters. When the one or more virtual face filters are selected by the user, the one or more sounds are played. For example, the user may remember the one or more virtual face filters and the one or more sounds associated with each of the one or more virtual face filters for the purpose of the authentication. In an embodiment of the present disclosure, the one or more virtual face filters and the one or more sounds have the same name and ID for the purpose of fetching them from the storage unit 206. For example, when the user selects a monkey virtual face filter, the monkey virtual face filter is superimposed on face of the user and monkey screeching sound effects are played, such that the user may easily remember the monkey virtual face filter at the time of authentication.

At step 314, authentication status of the user is determined by comparing the generated plurality of similarity scores with a predefined threshold score by using the corresponding score generation models. In an embodiment of the present disclosure, the authentication status is authentication failed or authentication successful. For example, when the generated plurality of similarity scores is above the predefined threshold score, the authentication status is authentication successful. when the generated plurality of similarity scores is below the predefined threshold score, the authentication status is authentication failed.

At step 316, the received request is approved upon determining that the determined authentication status is authentication successful. In an embodiment of the present disclosure, the received request is declined upon determining that the determined authentication status is authentication failed.

In an embodiment of the present disclosure, the method 300 includes determining a facial emotion of the user based on the extracted set of facial features by using an emotion determination-based AI model. In an exemplary embodiment of the present disclosure, the facial emotion include smile, anger, contempt, disgust, fear, joy, sadness, surprise, or the like. Further, the method 300 includes obtaining a predefined facial emotion associated with the user from the storage unit 206. The predefined facial emotion is a facial emotion of the user obtained and stored in the storage unit 206 during the registration process. The method 300 includes generating the plurality of similarity scores for the determined facial emotion based on the obtained predefined facial emotion by using the corresponding score generation models. In an embodiment of the present disclosure, the plurality of similarity scores for the determined facial emotion is generated by comparing the determined facial emotion with the obtained predefined facial emotion by using the corresponding score generation models. Furthermore, the method 300 includes determining the authentication status of the user by comparing the generated plurality of similarity scores with the predefined threshold score by using the corresponding score generation models. In an embodiment of the present disclosure, the method 300 includes approving the received request upon determining that the determined authentication status is authentication successful.

Further, in determining the authentication status of the user by comparing the generated plurality of similarity scores with the predefined threshold score by using the corresponding score generation models, the method 300 includes generating an overall score based on the generated plurality of similarity scores for the extracted set of facial features, the generated plurality of similarity scores for the received set of point clouds, the generated plurality of similarity scores for the selected one or more virtual face filters, the generated plurality of similarity scores for the determined facial emotion and a predefined score weightage criteria by using the corresponding score generation models. In an embodiment of the present disclosure, a weightage is assigned to each of the generated plurality of similarity scores for the extracted set of facial features, the generated plurality of similarity scores for the received set of point clouds, the generated plurality of similarity scores for the selected one or more virtual face filters and the generated plurality of similarity scores for the determined facial emotion based on the predefined score weightage criteria. For example, the weightage assigned to the generated plurality of similarity scores for the selected one or more virtual face filters is maximum and the weightage assigned to the generated plurality of similarity scores for the extracted set of facial features is minimum. Further, the method 300 includes comparing the generated overall score with the predefined threshold score by using the corresponding score generation models. Furthermore, the data determination module 222 determines the authentication status of the user based on result of comparison.

In an embodiment of the present disclosure, the method 300 includes generating the plurality of similarity scores for the extracted set of facial features, the received set of point clouds, the selected one or more virtual face filters, the determined facial emotion or any combination thereof based on the obtained one or more prestored authentication parameters and the obtained predefined facial emotion by using the corresponding score generation models. Further, the method 300 includes determining the authentication status of the user by comparing the generated plurality of similarity scores associated with the extracted set of facial features, the received set of point clouds, the selected one or more virtual face filters, the determined facial emotion, or any combination thereof with the predefined threshold score by using the corresponding score generation models. Furthermore, the method 300 includes approving the received request upon determining that the determined authentication status is authentication successful. For example, the face of the user may be authenticated based on the extracted set of facial features, the set of point clouds, the facial emotion of the user, the selected one or more virtual face filters or any combination thereof.

The method 300 includes superimposing the one or more virtual face filters on the face of the user in the one or more images, the one or more videos or a combination thereof. Further, the method 300 includes extracting the set of facial features of the user from the one or more images, the one or more videos of the user or a combination thereof by using the feature extraction-based AI model. The method 300 includes determining the facial emotion of the user with the superimposed one or more virtual filters based on the extracted set of facial features by using the emotion determination-based AI model. The method 300 includes generating the plurality of similarity scores for the determined facial emotion based on the obtained predefined facial emotion and, the predefined name, the predefined ID or a combination thereof for each of the one or more virtual face filters by using the corresponding score generation models. Furthermore, the method 300 includes determining the authentication status of the user by comparing the generated plurality of similarity scores with the predefined threshold score by using the corresponding score generation models. The method 300 includes approving the received request upon determining that the determined authentication status is authentication successful. For example, the user is required to put a virtual monkey filter on his face and then required to smile in the virtual monkey filter during the authentication process, because the user used the 'virtual monkey filter' as the virtual filter and 'smile' as the facial emotion while registering with the computing system 104.

The method 300 may be implemented in any suitable hardware, software, firmware, or combination thereof.

Figure 4:
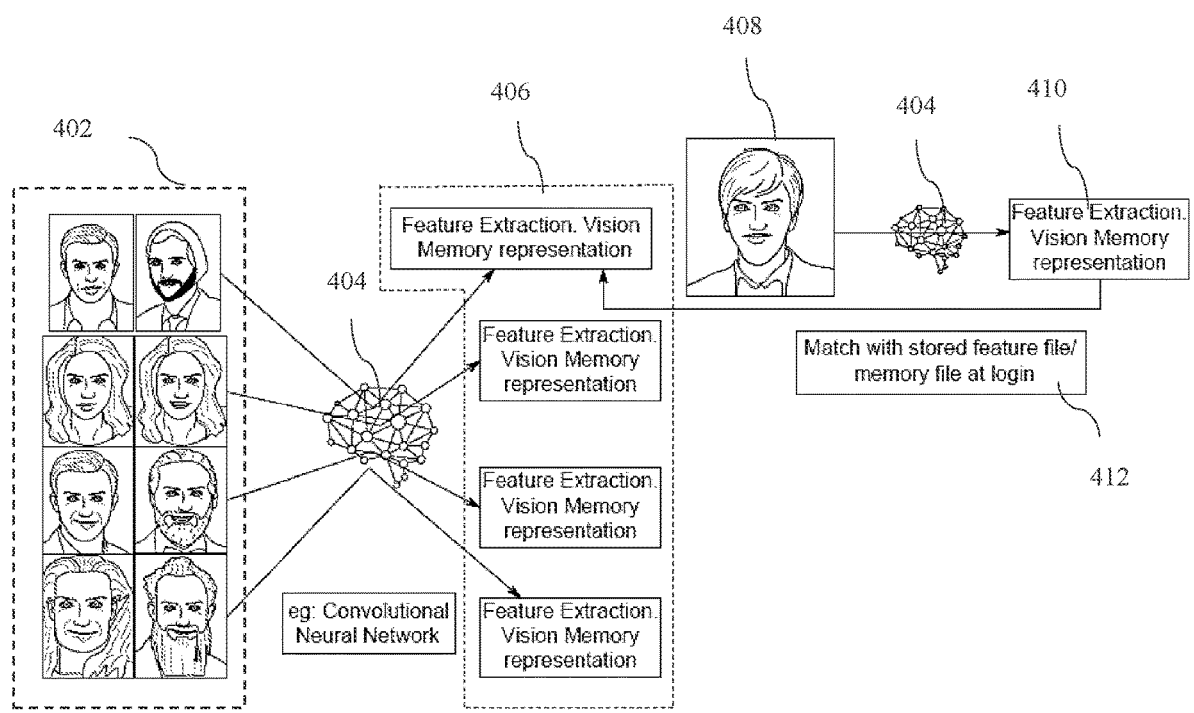
FIG. 4 is schematic representation of the computing system for authenticating face of the user by using a set of facial features, in accordance with an embodiment of the present disclosure.

FIG. 4 is schematic representation of the computing system 104 for authenticating face of the user by using the set of facial features, in accordance with an embodiment of the present disclosure. In an embodiment of the present disclosure, one or more inputs 402 are received from a set of users to register the set of users with the computing system 104. The one or more inputs 402 are a set of images associated with the set of users depicting face of the set of users. In an exemplary embodiment of the present disclosure, the face of the set of users are with beard, without beard, with smile, without smile, with cap, without cap, with long hair, with short hair and the like, such that the set of facial features are extracted accurately. Further, the feature extraction-based AI model 404 extracts the set of facial features from each of the set of images. In an embodiment of the present disclosure, the extracted set of facial features correspond to vision memory representation. In an embodiment of the present disclosure, the vision memory representation is mathematical representation of the extracted set of facial features. The extracted set of facial features may be stored in the storage unit 206 as a feature file or memory file. In an embodiment of the present disclosure, the extracted set of facial features associated with each of the set of images are one or more outputs 406 of the feature extraction-based AI model 404. Furthermore, during the authentication, the computing system 104 receives an image 408 of a user, and the feature extraction-based AI model 404 extracts the set of facial features 410 from the received image at real-time. At 412, the extracted set of facial features are matched with the feature file or the memory file corresponding to the user while login. When the feature file or the memory file matches with the extracted set of facial features with high similarity score, authentication or verification is successful. When the feature file or the memory file matches with the extracted set of facial features with low similarity score, the verification is failed.

Figure 5:
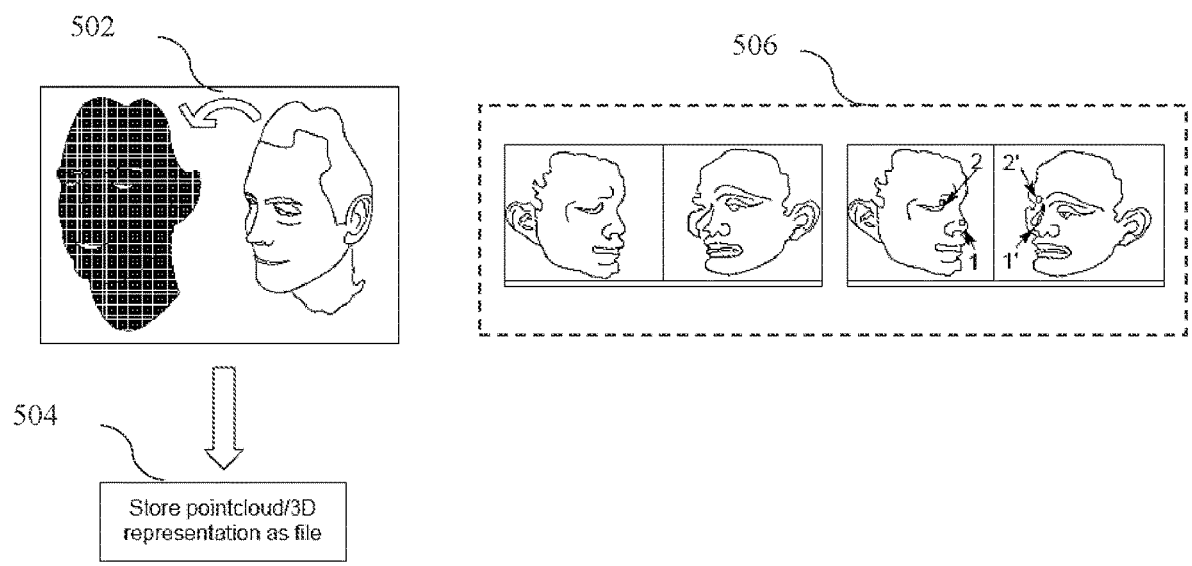
FIG. 5 is schematic representation of the computing system for authenticating the face of the user by using a set of point clouds, in accordance with an embodiment of the present disclosure.

FIG. 5 is schematic representation of the computing system 104 for authenticating face of the user by using the set of point clouds, in accordance with an embodiment of the present disclosure. At 502, the computing system 104 uses one or more sensors 108 on the electronic devices associated with the user to extract the set of face point clouds or 3D representation of the user during the registration. Further, at 504, the set of point clouds or the 3D representation are stored in the storage unit 206 as a memory file. During authentication, the computing system 104 receives the set of point clouds associated with the face of the user by using the one or more sensors 108 at real-time. At 506, the received set of point clouds are matched with the stored memory file. When the memory file matches with the received set of point clouds with high similarity score, authentication or verification is successful. When the stored memory file matches with the received set of point clouds with low similarity score, the verification is failed.

Figure 6:
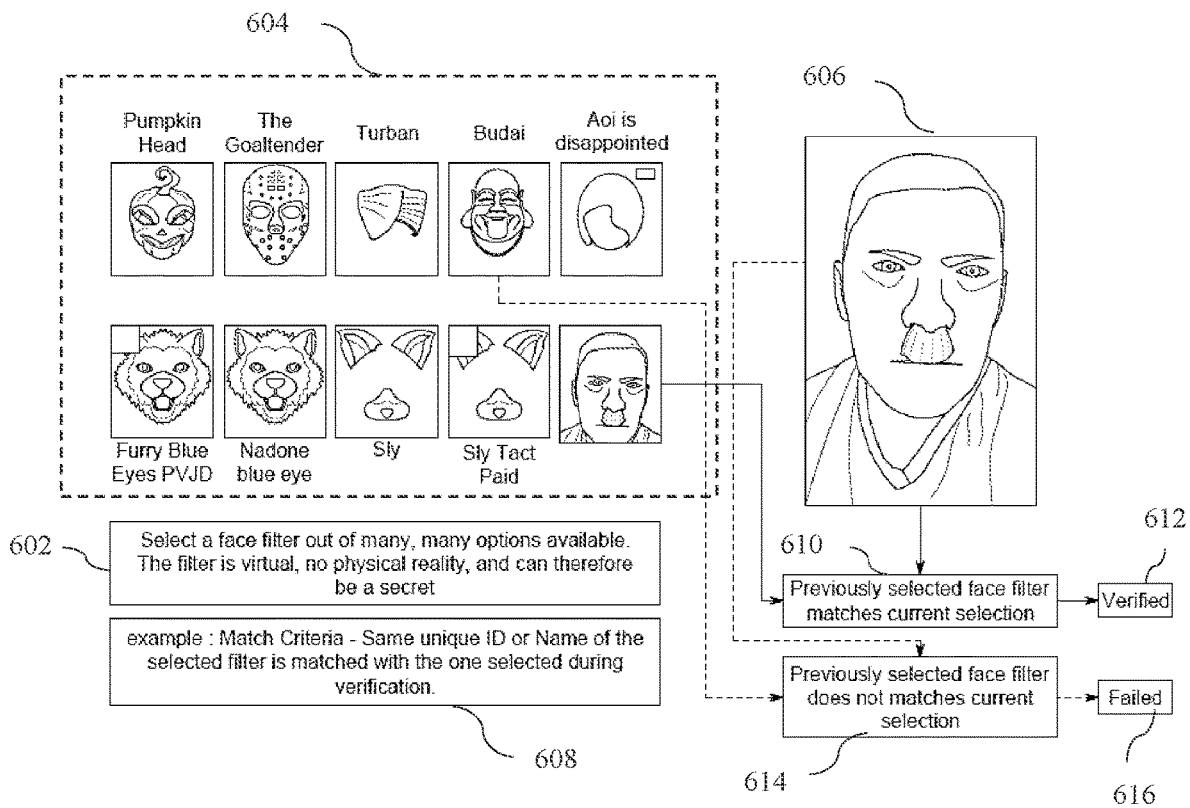
FIG. 6 is schematic representation of the computing system for authenticating the face of the user by using one or more virtual face filters, in accordance with an embodiment of the present disclosure.

FIG. 6 is schematic representation of the computing system 104 for authenticating face of the user by using the one or more virtual face filters, in accordance with an embodiment of the present disclosure. At 602, the user provides the one or more inputs to select the one or more virtual face filters from the plurality of virtual filters 604 while registering himself with the computing system 104. In the current scenario, the user selects a human character with moustache. Further, during the authentication, the user provides the one or more inputs to select the same virtual filter 606 which he selected during the registration. 608 represents the matching criteria i.e., same unique ID or name of the selected filter is matched with the one selected during registration. At 610, when previously selected face filter matches with current selection, the use is verified 612. In the current scenario, the user chose the human character with moustache during registration and the verification. At 614, when the previously selected face filter does not match with the current selection, the user's verification is failed 616.

Figure 7:
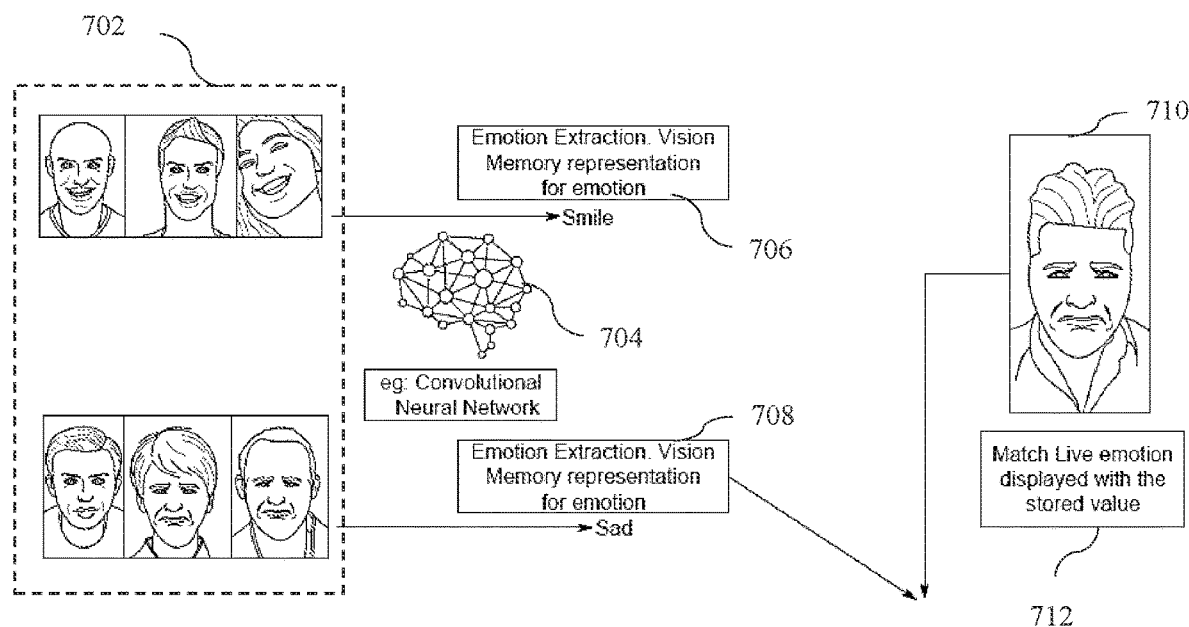
FIG. 7 is schematic representation of the computing system for authenticating the face of the user by using facial emotion, in accordance with an embodiment of the present disclosure.

FIG. 7 is schematic representation of the computing system 104 for authenticating the face of the user by using facial emotion, in accordance with an embodiment of the present disclosure. In an embodiment of the present disclosure, one or more inputs 702 are received from a set of users to register the set of users with the computing system 104. The one or more inputs 702 are a set of images associated with the set of users depicting face of the set of users. Further, the emotion determination-based AI model 704 determines the facial emotion from each of the set of images. In an embodiment of the present disclosure, the determined facial emotion corresponds to vision memory representation for emotion. In the current scenario, the determined facial emotion is happy 706 and sad 708. The determine facial emotion may be stored in the storage unit 206 as a value. In an embodiment of the present disclosure, the determined facial emotion is output of the emotion determination-based AI model 704. Furthermore, during the authentication, the computing system 104 receives an image 710 of the user, and the emotion determination-based AI model 704 determines the facial emotion from the received image at real-time. Further at 712, the determined facial emotion is matched with the stored value corresponding to the user while login. When the stored value matches with the determined facial emotion with high similarity score, the verification is successful. When the stored value matches with the determined facial emotion with low similarity score, the verification is failed.

Figure 8:
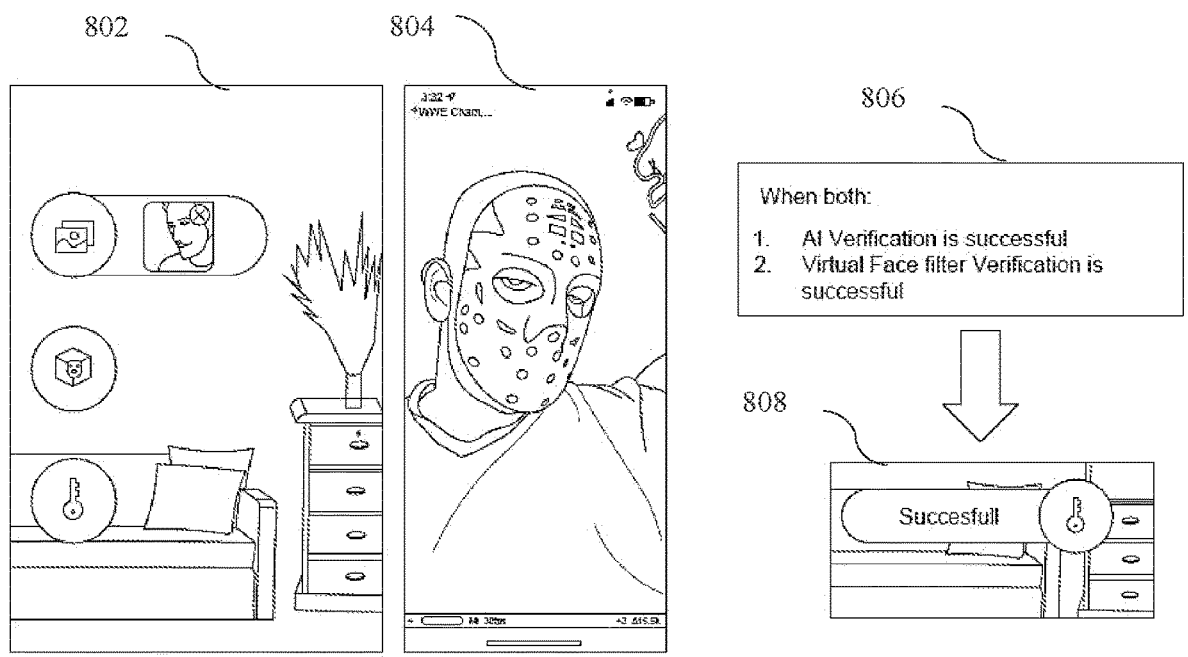
FIG. 8 is schematic representation of the computing system for authenticating the face of the user by using the set of facial features and the one or more virtual face filters, in accordance with an embodiment of the present disclosure.

FIG. 8 is schematic representation of the computing system 104 for authenticating face of the user by using the set of facial features and the one or more virtual face filters, in accordance with an embodiment of the present disclosure. 802 depicts verification of the user by using the set of facial features and 804 depicts verification of the user by using the one or more virtual face filters. At 806, when both AI verification i.e., verification of the user by using the set of facial features is successful and the virtual face filter verification is successful, the user is verified successfully at 808.

Thus, various embodiments of the present computing system 104 provide a solution to facilitate multi-factor face authentication of user. The computing system 104 proposes a multi-factor authentication on top of face recognition. The virtual object i.e., 2D or 3D object, is superimposed on face of the user. The user is allowed to select one or more unique virtual objects from list of objects available in the inventory, which the user has registered at the time of registering the face template. The virtual object can be authenticated along with one or more facial expressions of the user. Another way of authenticating the face of the user could be based on one or more real objects on the face of the user. Another example of authenticating the face of the user is based on combination of one or more virtual objects, real objects, and facial expression of the user. In an embodiment of the present disclosure, the one or more sounds are used to give user experience with face filters that helps to memorize the selected virtual face filter. For example, a monkey mask may play the monkey sound for better user experience. It is part of the selection of unique mask i.e., photographic, and audio-graphic memory.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A computing system for facilitating multi-factor face authentication of user, the computing system comprising:
one or more hardware processors; and
a memory coupled to the one or more hardware processors, wherein the memory comprises a plurality of modules in the form of programmable instructions executable by the one or more hardware processors, and wherein the plurality of modules comprises:
a request receiver module configured to receive a request from one or more electronic devices associated with a user to authenticate face of the user, wherein the received request comprises at least one of: one or more images and one or more videos of the user;
a data extraction module configured to extract a set of facial features of the user from the at least one of: one or more images and one or more videos of the user by using a feature extraction-based Artificial Intelligence (AI) model;
a data receiver module configured to receive a set of point clouds associated with the face of the user by using one or more sensors, wherein the received set of point clouds represent Three-Dimension (3D) face model of the user;
an input receiver module configured to receive one or more inputs from the user to select one or more virtual face filters from a plurality of virtual filters;
a data obtaining module configured to obtain one or more prestored authentication parameters associated with the user from a storage unit, wherein the one or more authentication parameters comprise a set of prestored facial features, a set of prestored point clouds and at least one of: a predefined name and a predefined ID for each of the one or more virtual face filters;
a score generation module configured to generate a plurality of similarity scores for each of the extracted set of facial features, the received set of point clouds and the selected one or more virtual face filters based on the obtained one or more prestored authentication parameters by using corresponding score generation models, wherein the plurality of similarity scores for the selected one or more virtual face filters indicates an exact match;
a data determination module configured to determine an authentication status of the user by comparing the generated plurality of similarity scores with a predefined threshold score by using the corresponding score generation models, wherein the authentication status is one of: authentication failed and authentication successful; and
a request approval module configured to approve the received request upon determining that the determined authentication status is authentication successful.

2. The computing system of claim 1, further comprising an emotion detection module configured to:
determine a facial emotion of the user based on the extracted set of facial features by using an emotion determination-based AI model, wherein the facial emotion comprise one of: smile, anger, contempt, disgust, fear, joy, sadness, and surprise;
obtain a predefined facial emotion associated with the user from the storage unit;
generate the plurality of similarity scores for the determined facial emotion based on the obtained predefined facial emotion by using the corresponding score generation models;
determine the authentication status of the user by comparing the generated plurality of similarity scores with the predefined threshold score by using the corresponding score generation models; and
approve the received request upon determining that the determined authentication status is authentication successful.

3. The computing system of claim 2, further comprising a data authentication module configured to:
generate the plurality of similarity scores for at least one of: the extracted set of facial features, the received set of point clouds, the selected one or more virtual face filters and the determined facial emotion based on the obtained one or more prestored authentication parameters and the obtained predefined facial emotion by using the corresponding score generation models;
determine the authentication status of the user by comparing the generated plurality of similarity scores associated with the at least one of: the extracted set of facial features, the received set of point clouds, the selected one or more virtual face filters and the determined facial emotion with the predefined threshold score by using the corresponding score generation models; and
approve the received request upon determining that the determined authentication status is authentication successful.

4. The computing system of claim 2, further comprising a data superimposing module configured to:
superimpose the one or more virtual face filters on the face of the user in the at least one of: one or more images and one or more videos;
extract the set of facial features of the user from the at least one of: one or more images and one or more videos of the user by using the feature extraction-based AI model;
determine the facial emotion of the user with the superimposed one or more virtual filters based on the extracted set of facial features by using the emotion determination-based AI model,
generate the plurality of similarity scores for the determined facial emotion based on the obtained predefined facial emotion and the at least one of: the predefined name and the predefined ID for each of the one or more virtual face filters by using the corresponding score generation models;
determine the authentication status of the user by comparing the generated plurality of similarity scores with the predefined threshold score by using the corresponding score generation models; and
approve the received request upon determining that the determined authentication status is authentication successful.

5. The computing system of claim 1, wherein in generating the plurality of similarity scores for each of the extracted set of facial features, the received set of point clouds and the selected one or more virtual face filters based on the obtained one or more prestored authentication parameters by using the corresponding score generation models, the score generation module is configured to:

compare the extracted set of facial features with the set of prestored facial features of the user by considering one or more facial parameters by using the corresponding score generation models;

generate the plurality of similarity scores for the extracted set of facial features based on result of comparison;

compare the received set of point clouds with the set of prestored point clouds by using the corresponding score generation models;

generate the plurality of similarity scores for the received set of point clouds based on result of comparison;

compare at least one of: name and ID of each of the one or more virtual face filters with the at least one of: the predefined name and the predefined ID by using the corresponding score generation models, wherein one or more sounds are associated with each of the one or more virtual face filters; and determine if the at least one of: name and ID of each of the one or more virtual face filters exactly matches with the at least one of: the predefined name and the predefined ID based on result of comparison, wherein if the at least one of: name and ID of each of the one or more virtual face filters exactly matches with the at least one of: the predefined name and the predefined ID based, the received request is approved.

6. The computing system of claim 5, wherein the one or more facial parameters comprise with beard, without beard, one or more real objects, age of the user, lighting conditions, and haircut.

7. The computing system of claim 5, wherein in determining the authentication status of the user by comparing the generated plurality of similarity scores with the predefined threshold score by using the corresponding score generation models, the data determination module is configured to:

generate an overall score based on the generated plurality of similarity scores for the extracted set of facial features, the generated plurality of similarity scores for the received set of point clouds, the generated plurality of similarity scores for the selected one or more virtual face filters, a generated plurality of similarity scores for a determined facial emotion and a predefined score weightage criteria by using the corresponding score generation models, compare the generated overall score with the predefined threshold score by using the corresponding score generation models; and determine the authentication status of the user based on result of comparison.

8. The computing system of claim 1, wherein the one or more sensors comprise Light Detection and Ranging (LiDAR) sensors and Infrared (IR) sensors.

9. The computing system of claim 1, wherein the one or more virtual face filters comprise at least one of: Augmented Reality (AR)-based 3D virtual filter and AR-based 2D virtual filter.

10. A method for facilitating multi-factor face authentication of user, the method comprising:

receiving, by one or more hardware processors, a request from one or more electronic devices associated with a user to authenticate face of the user, wherein the received request comprises at least one of: one or more images and one or more videos of the user;

extracting, by the one or more hardware processors, a set of facial features of the user from the at least one of: one or more images and one or more videos of the user by using a feature extraction-based Artificial Intelligence (AI) model;

receiving, by the one or more hardware processors, a set of point clouds associated with the face of the user by using one or more sensors, wherein the received set of point clouds represent Three-Dimension (3D) face model of the user;

receiving, by the one or more hardware processors, one or more inputs from the user to select one or more virtual face filters from a plurality of virtual filters;

obtaining, by the one or more hardware processors, one or more prestored authentication parameters associated with the user from a storage unit, wherein the one or more authentication parameters comprise a set of prestored facial features, a set of prestored point clouds and at least one of: a predefined name and a predefined ID for each of the one or more virtual face filters;

generating, by one or more hardware processors, a plurality of similarity scores for each of the extracted set of facial features, the received set of point clouds and the selected one or more virtual face filters based on the obtained one or more prestored authentication parameters by using corresponding score generation models, wherein the plurality of similarity scores for the selected one or more virtual face filters indicates an exact match;

determining, by the one or more hardware processors, an authentication status of the user by comparing the generated plurality of similarity scores with a predefined threshold score by using the corresponding score generation models, wherein the authentication status is one of: authentication failed and authentication successful; and approving, by the one or more hardware processors, the received request upon determining that the determined authentication status is authentication successful.

11. The method of claim 10, further comprising:

determining a facial emotion of the user based on the extracted set of facial features by using an emotion determination-based AI model, wherein the facial emotion comprise one of: smile, anger, contempt, disgust, fear, joy, sadness, and surprise;

obtaining a predefined facial emotion associated with the user from the storage unit;

generating the plurality of similarity scores for the determined facial emotion based on the obtained predefined facial emotion by using the corresponding score generation models;

determining the authentication status of the user by comparing the generated plurality of similarity scores with the predefined threshold score by using the corresponding score generation models; and approving the received request upon determining that the determined authentication status is authentication successful.

12. The method of claim 11, further comprising:

generating the plurality of similarity scores for at least one of: the extracted set of facial features, the received set of point clouds, the selected one or more virtual face filters and the determined facial emotion based on the obtained one or more prestored authentication parameters and the obtained predefined facial emotion by using the corresponding score generation models;

determining the authentication status of the user by comparing the generated plurality of similarity scores associated with the at least one of: the extracted set of facial features, the received set of point clouds, the selected one or more virtual face filters and the determined facial emotion with the predefined threshold score by using the corresponding score generation models; and approving the received request upon determining that the determined authentication status is authentication successful.

13. The method of claim 10, wherein generating the plurality of similarity scores for each of the extracted set of facial features, the received set of point clouds and the selected one or more virtual face filters based on the obtained one or more prestored authentication parameters by using the corresponding score generation models comprises:

comparing the extracted set of facial features with the set of prestored facial features of the user by considering one or more facial parameters by using the corresponding score generation models;

generating the plurality of similarity scores for the extracted set of facial features based on result of comparison;

comparing the received set of point clouds with the set of prestored point clouds by using the corresponding score generation models;

generating the plurality of similarity scores for the received set of point clouds based on result of comparison;

comparing at least one of: name and ID of each of the one or more virtual face filters with the at least one of: the predefined name and the predefined ID by using the corresponding score generation models wherein one or more sounds are associated with each of the one or more virtual face filters; and determining if the at least one of: name and ID of each of the one or more virtual face filters exactly matches with the at least one of: the predefined name and the predefined ID based on result of comparison, wherein if the at least one of: name and ID of each of the one or more virtual face filters exactly matches with the at least one of: the predefined name and the predefined ID based, the received request is approved.

14. The method of claim 13, wherein the one or more facial parameters comprise with beard, without beard, one or more real objects, age of the user, lighting conditions, and haircut.

15. The method of claim 13, wherein determining the authentication status of the user by comparing the generated plurality of similarity scores with the predefined threshold score by using the corresponding score generation models comprises:

generating an overall score based on the generated plurality of similarity scores for the extracted set of facial features, the generated plurality of similarity scores for the received set of point clouds, the generated plurality of similarity scores for the selected one or more virtual face filters, a generated plurality of similarity scores for a determined facial emotion and a predefined score weightage criteria by using the corresponding score generation models;

comparing the generated overall score with the predefined threshold score by using the corresponding score generation models; and determining the authentication status of the user based on result of comparison.

16. The method of claim 10, wherein the one or more sensors comprise Light Detection and Ranging (LiDAR) sensors and Infrared (IR) sensors.

17. The method of claim 10, wherein the one or more virtual face filters comprise at least one of: Augmented Reality (AR)-based 3D virtual filter and AR-based 2D virtual filter.

18. The method of claim 10, further comprising:

superimposing the one or more virtual face filters on the face of the user in the at least one of: one or more images and one or more videos;

extracting the set of facial features of the user from the at least one of: one or more images and one or more videos of the user by using the feature extraction-based AI model;

determining the facial emotion of the user with the superimposed one or more virtual filters based on the extracted set of facial features by using the emotion determination-based AI model;

generating the plurality of similarity scores for the determined facial emotion based on the obtained predefined facial emotion and the at least one of: the predefined name and the predefined ID for each of the one or more virtual face filters by using the corresponding score generation models;

determining the authentication status of the user by comparing the generated plurality of similarity scores with the predefined threshold score by using the corresponding score generation models, and approving the received request upon determining that the determined authentication status is authentication successful.

19. A non-transitory computer-readable storage medium having instructions stored therein that, when executed by a hardware processor, cause the processor to perform method steps comprising:

receiving a request from one or more electronic devices associated with a user to authenticate face of the user, wherein the received request comprises at least one of: one or more images and one or more videos of the user;

extracting a set of facial features of the user from the at least one of: one or more images and one or more videos of the user by using a feature extraction-based Artificial Intelligence (AI) model;

receiving a set of point clouds associated with the face of the user by using one or more sensors, wherein the received set of point clouds represent Three-Dimension (3D) face model of the user;

receiving one or more inputs from the user to select one or more virtual face filters from a plurality of virtual filters;

obtaining one or more prestored authentication parameters associated with the user from a storage unit, wherein the one or more authentication parameters comprise a set of prestored facial features, a set of prestored point clouds and at least one of: a predefined name and a predefined ID for each of the one or more virtual face filters;

generating a plurality of similarity scores for each of the extracted set of facial features, the received set of point clouds and the selected one or more virtual face filters based on the obtained one or more prestored authentication parameters by using corresponding score generation models, wherein the plurality of similarity scores for the selected one or more virtual face filters indicates an exact match;

determining an authentication status of the user by comparing the generated plurality of similarity scores with a predefined threshold score by using the corresponding score generation models, wherein the authentication status is one of: authentication failed and authentication successful; and approving the received request upon determining that the determined authentication status is authentication successful.

20. The non-transitory computer-readable storage medium of claim 19, wherein the one or more virtual face filters comprise at least one of: Augmented Reality (AR)-based 3D virtual filter and AR-based 2D virtual filter.

* * * * *